(12) United States Patent
Oh

(10) Patent No.: US 11,298,999 B2
(45) Date of Patent: Apr. 12, 2022

(54) SUSPENSION SYSTEM FOR VEHICLE WITH COMPOSITE SPRING

(71) Applicants: HYUNDAI MOTOR COMPANY, Seoul (KR); KIA MOTORS CORPORATION, Seoul (KR)

(72) Inventor: Seung Hyun Oh, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/535,702

(22) Filed: Aug. 8, 2019

(65) Prior Publication Data

US 2020/0282785 A1     Sep. 10, 2020

(30) Foreign Application Priority Data

Mar. 8, 2019   (KR) .................. 10-2019-0026914

(51) Int. Cl.
*B60G 11/00* (2006.01)
*B60G 11/04* (2006.01)
*B60G 11/10* (2006.01)

(52) U.S. Cl.
CPC .............. *B60G 11/04* (2013.01); *B60G 11/10* (2013.01); *B60G 2202/112* (2013.01); *B60G 2204/121* (2013.01)

(58) Field of Classification Search
CPC .............. B60G 11/04; B60G 2200/326; B60G 2206/428; B60G 11/02; B60G 11/10; B60G 9/02; B60G 17/023; B60G 11/107; B60G 11/08; B60G 2202/11; B60G 2202/112; B60G 2202/114; B60G 2204/121; B60G 2800/162; B60G 2500/20; F16H 35/18; F16H 25/20; F16F 1/22; F16F 3/023; F16F 2228/066; B62D 21/02
USPC ..................................... 280/124.163, 124.17
See application file for complete search history.

(56) References Cited

U.S. PATENT DOCUMENTS

| 1,384,146 | A | * | 7/1921 | Montgomery | ......... | B60G 21/04 267/40 |
| 4,749,206 | A | * | 6/1988 | Delery | ................... | B60G 11/02 280/104 |
| 4,804,205 | A | * | 2/1989 | Parsons | ................... | B60G 5/03 180/352 |

(Continued)

FOREIGN PATENT DOCUMENTS

| CN | 202491648 U | 10/2012 |
| EP | 3083371 B1 | 2/2018 |

(Continued)

*Primary Examiner* — Toan C To
(74) *Attorney, Agent, or Firm* — Lempia Summerfield Katz LLC

(57) ABSTRACT

A suspension system for a vehicle with a composite spring may include: a first longitudinally mounted spring 10 and a second longitudinally mounted spring 20 generating vertical stiffness of a vehicle; and a transversely mounted spring 30 generating roll stiffness and connected to the first and second longitudinally mounted springs. In particular, the transversely mounted spring 30 is connected to a vehicle body 1 by a support member 40. Stiffness of the vehicle may be further strengthened during a longitudinal behavior and a rolling behavior of the vehicle, and thus, running stability may be significantly enhanced.

10 Claims, 4 Drawing Sheets

(56) References Cited

U.S. PATENT DOCUMENTS

| | | | | |
|---|---|---|---|---|
| 5,401,049 A | * | 3/1995 | Richardson | B60G 5/043 |
| | | | | 280/124.134 |
| 6,189,904 B1 | * | 2/2001 | Gentry | B60G 11/08 |
| | | | | 267/149 |
| 6,254,114 B1 | * | 7/2001 | Pulling | B60G 7/005 |
| | | | | 280/93.511 |
| 6,352,245 B1 | | 3/2002 | Norden | |
| 7,104,560 B2 | * | 9/2006 | Momiyama | B60G 9/025 |
| | | | | 280/124.107 |
| 8,485,542 B1 | * | 7/2013 | Nine | B60G 9/04 |
| | | | | 280/124.17 |
| 9,278,596 B2 | | 3/2016 | Hummelt et al. | |
| 2006/0290089 A1 | * | 12/2006 | Dudding | B60G 11/465 |
| | | | | 280/124.116 |
| 2007/0085295 A1 | * | 4/2007 | Johnson | B60G 11/15 |
| | | | | 280/124.152 |
| 2007/0262547 A1 | * | 11/2007 | Warinner | B60G 9/003 |
| | | | | 280/124.17 |
| 2018/0194185 A1 | * | 7/2018 | Meza | F16F 1/182 |

FOREIGN PATENT DOCUMENTS

| | | |
|---|---|---|
| JP | S9-140108 A | 8/1984 |
| JP | H07-005817 U | 1/1995 |
| JP | 2580239 Y2 | 6/1998 |
| KR | 20-1992-0000546 U | 1/1992 |
| KR | 10-2003-0049236 A | 6/2003 |
| KR | 10-2018-0066540 A | 6/2018 |
| WO | 2015/090750 A1 | 6/2015 |

* cited by examiner

SUSPENSION SYSTEM FOR VEHICLE WITH COMPOSITE SPRING

CROSS REFERENCE TO RELATED APPLICATION

This application claims priority to and the benefit of Korean Patent Application No. 10-2019-0026914, filed on Mar. 8, 2019, the entire contents of which are incorporated herein by reference.

FIELD

The present disclosure relates to a suspension system for a vehicle with a composite spring capable of improving vertical stiffness and roll stiffness of a vehicle.

BACKGROUND

The statements in this section merely provide background information related to the present disclosure and may not constitute prior art.

A suspension system for a vehicle is a system for reducing or preventing vibrations or shocks received from a road surface from being directly transmitted to a vehicle body when a vehicle is driving, thus preventing damage to the vehicle body or cargo and improving ride comfort.

The related art rear suspension system used in small-sized buses or large trucks typically include two leaf springs arranged in a front-rear direction on the left and right sides of a vehicle and a stabilizer bar disposed in a left-right direction of the vehicle.

The leaf spring, which is a component for connecting a vehicle body and a chassis (rear axle), serves to alleviate and suppress an impact from the road surface transmitted to the vehicle body through vertical stiffness, and the stabilizer bar exerts a torsional force by itself when both wheels move in mutually opposite phases to each other to suppress rolling that occurs in the vehicle body during driving, thus improving vehicle running stability.

The leaf spring may be configured as a multi-plate spring formed of steel or configured as a composite spring as a single component containing glass fiber, carbon fiber, or the like. The multi-plate leaf spring formed of steel is advantageous to ensure durability and the composite spring is advantageous to reduce weight and enhance fuel efficiency.

However we have discovered that, in the related art suspension system using the leaf spring and the stabilizer bar, the leaf spring and the stabilizer bar are separate components and installed separately, resulting in incurring high cost in connection with manufacturing and installation.

Further, although the stabilizer bar is effective for suppressing rolling, we have found that it causes a large roll angle as vehicles are heavy, and therefore, sufficient roll stiffness cannot be ensured, which is disadvantageous in terms of vehicle stability.

The contents described as the related art have been provided only to assist in understanding the background of the present disclosure and should not be considered as corresponding to the related art known to those having ordinary skill in the art.

SUMMARY

The present disclosure provides a suspension system for a vehicle with a composite spring, in which a longitudinally mounted spring for providing vertical stiffness of a vehicle and a transversely mounted spring for providing roll stiffness of the vehicle are connected using a composite spring, thereby reducing the number of components related to manufacturing and installation and cost.

The present disclosure also enhances vertical stiffness and roll stiffness through a connection structure of a longitudinally mounted spring and a transversely mounted spring, and improves running performance through the connection structure, particularly reducing a thickness through stiffness enhancement to thus reduce cost and weight.

In addition, the present disclosure provides an enhanced vertical stiffness and roll stiffness through a support member connecting a transversely mounted spring and a vehicle body.

According to an exemplary form of the present disclosure, a suspension system for a vehicle with a composite spring includes: a first longitudinally mounted spring and a second longitudinally mounted spring respectively arranged on a left side and a right side of a vehicle, wherein the first and second longitudinally mounted springs extend in a front-rear direction of the vehicle, and each have one side and another side, both sides connected to a vehicle body of the vehicle; a transversely mounted spring connected to the first longitudinally mounted spring and the second longitudinally mounted spring and installed in a transverse direction of the vehicle; and an axle bracket connected to a portion where the first longitudinally mounted spring and the transversely mounted spring are connected. In particular, the axle bracket is connected to a portion where the second longitudinally mounted spring and the transversely mounted spring are connected.

The suspension system may further include: a support member placed on the transversely mounted spring and disposed in the transverse direction, and including: one side and other side connected to the vehicle body, and a middle portion connected to the transversely mounted spring.

The transversely mounted spring may include a first transversely mounted spring integrally formed with the first longitudinally mounted spring and a second transversely mounted spring integrally formed with the second longitudinally mounted spring, and the first transversely mounted spring and the second transversely mounted spring may be connected by a connection bracket.

The connection bracket may include one recess and the other recess, which are inserted in a direction in which an end portion of the first transversely mounted spring and an end portion of the second transversely mounted spring face to each other.

An intermediate bracket may be superposed on the connection bracket, and a middle portion of the support member may be connected to the transversely mounted spring by a bolt penetrating through the support member, the intermediate bracket, the connection bracket, and the first and second transversely mounted springs.

The suspension system may further include: an upper cover bracket and a lower cover bracket wrapping the portion where the first longitudinally mounted spring and the transversely mounted spring are connected and the portion where the second longitudinally mounted spring and the transversely mounted spring are connected, respectively; and a U-bolt wrapping the upper cover bracket and penetrating through the lower cover bracket and a nut fastened to the U-bolt, wherein the lower cover bracket is integrally coupled to the axle bracket.

The first longitudinally mounted spring, the second longitudinally mounted spring, and the transversely mounted spring may be formed of a composite material, and the support member may be formed of either steel or a composite material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
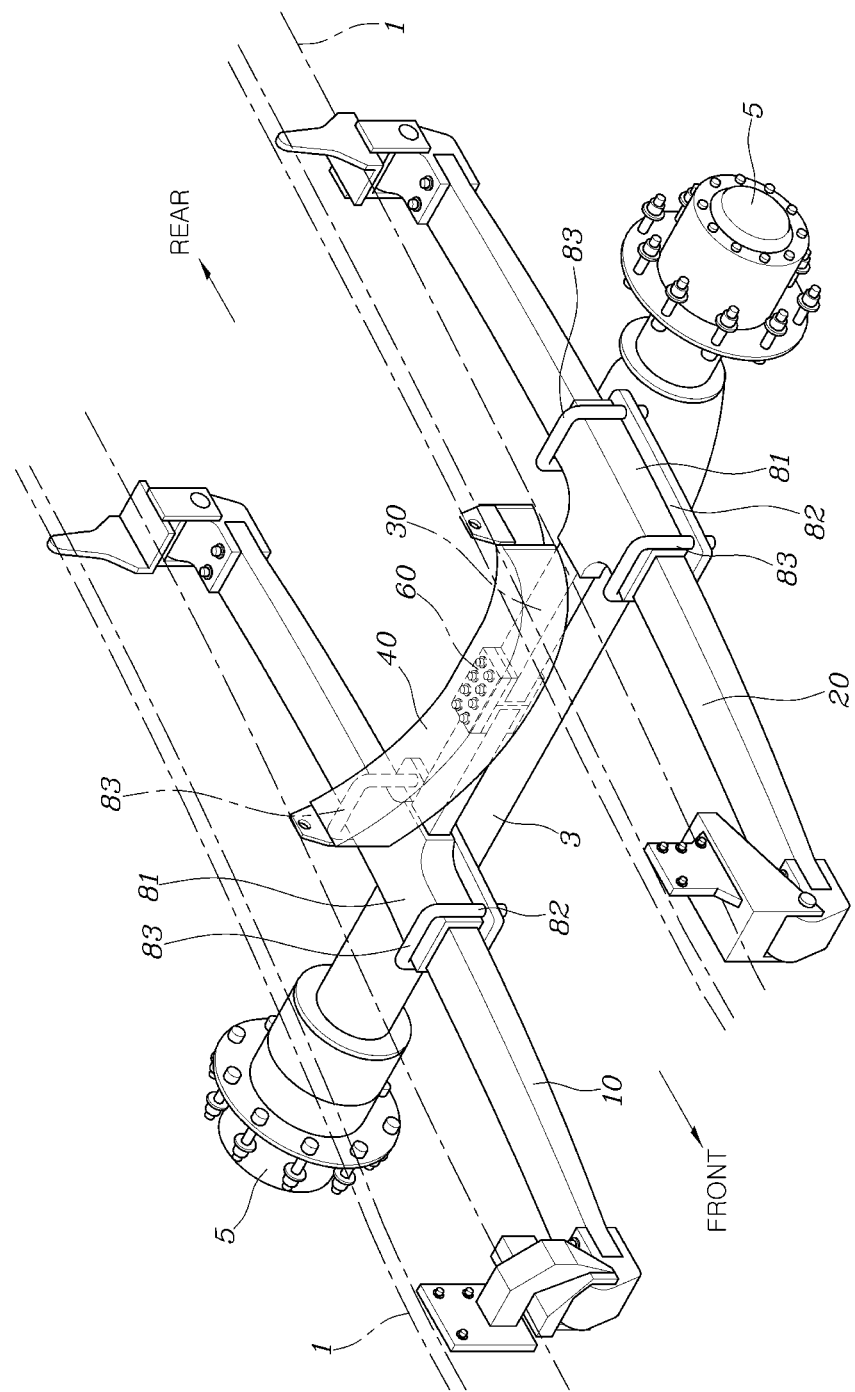
FIG. 1 is a perspective view of a suspension system for a vehicle with a composite spring according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a suspension system for a vehicle with a composite spring according to forms of the present disclosure is described with reference to the accompanying drawings.

Figure 2:
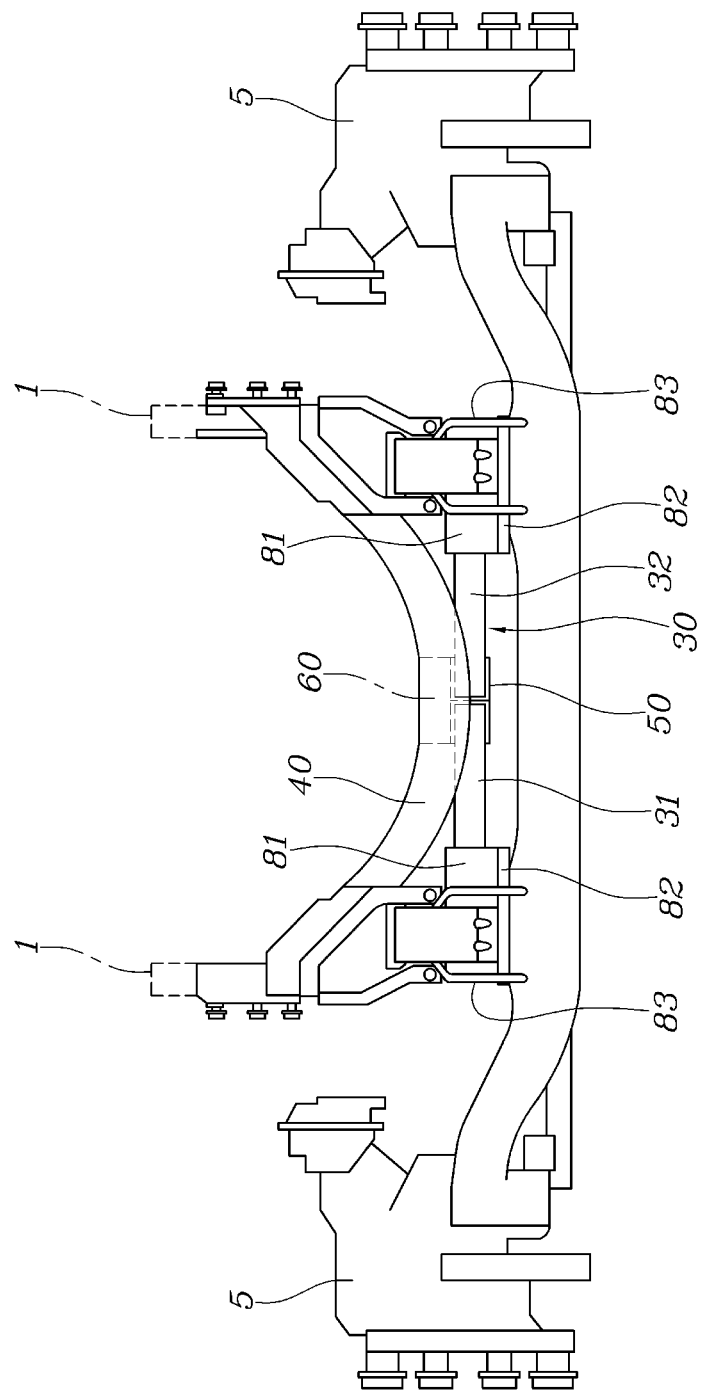
FIG. 2 is a front view of FIG. 1.
Figure 3:
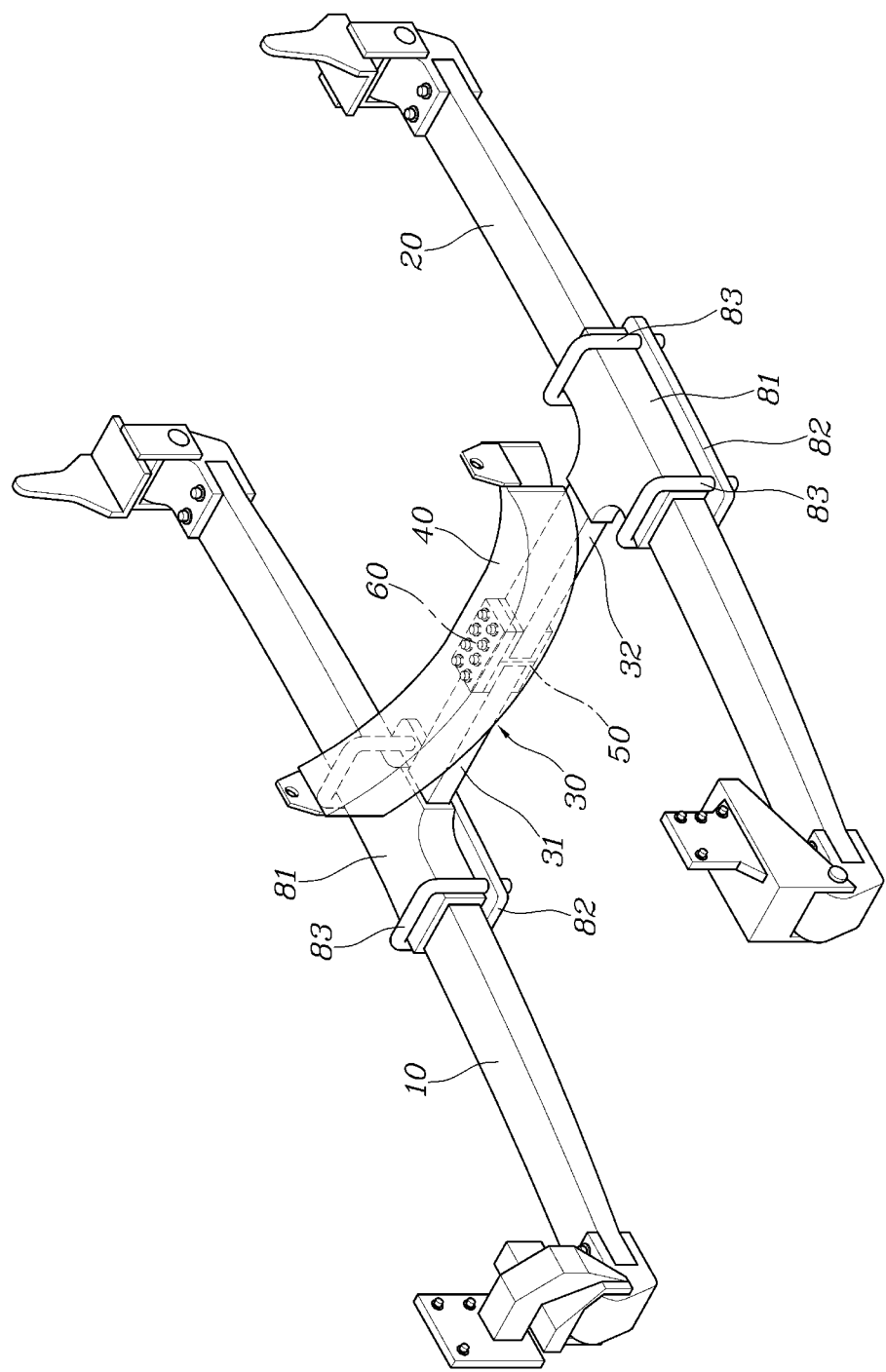
FIG. 3 is a perspective view illustrating a state in which a rear axle is removed in FIG. 1.
Figure 4:
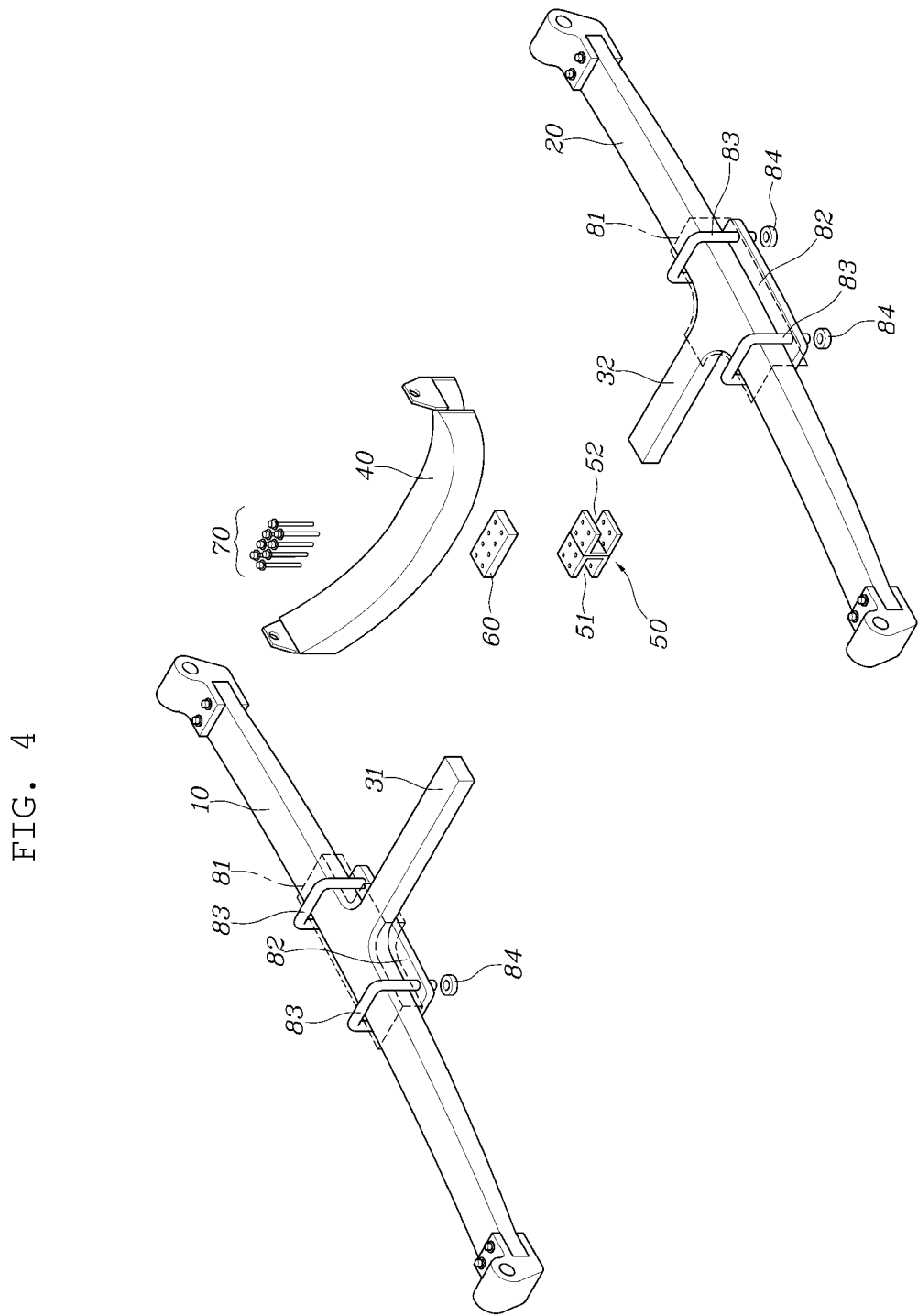
FIG. 4 is an exploded perspective view of FIG. 3.

As illustrated in FIGS. 1 to 4, the suspension system for a vehicle with a composite spring according to one form of the present disclosure includes: a first longitudinally mounted spring 10 and a second longitudinally mounted spring 20 respectively arranged on left and right sides of a vehicle, extending in a front-rear direction of the vehicle, and having one side (front end) and the other side (rear end) connected to a vehicle body 1 of the vehicle; a transversely mounted spring 30 connected to the first longitudinally mounted spring 10 and the second longitudinally mounted spring 20 and installed in a transverse direction of the vehicle; and an axle bracket 3 connected to a portion where the first longitudinally mounted spring 10 and the transversely mounted spring 20 are connected. In particular, the axle bracket 3 is also connected to a portion where the second longitudinally mounted spring 20 and the transversely mounted spring 30 are connected.

The first longitudinally mounted spring 10, the second longitudinally mounted spring 20, and the transversely mounted spring 30 are formed of a composite material containing unidirectional glass fiber or carbon fiber for weight reduction and fuel efficiency improvement.

The first longitudinally mounted spring 10 and the second longitudinally mounted spring 20 serve as leaf springs constituting the related art rear suspension system. The first longitudinally mounted spring 10 and the second longitudinally mounted spring 20 serve to enhance vertical stiffness of the vehicle, while making a compression and tension movement in an up-down direction when the vehicle moves in the up-down direction, and serve to enhance ride comfort through a spring force during the compression and tension movement in the up-down direction.

The transversely mounted spring 30 serve as a stabilizer bar constituting the rear suspending system. The transversely mounted spring 30 serves to enhance roll stiffness of the vehicle by exerting a torsional force by itself when both wheels move in mutually opposite phases and serves to enhance running stability by suppressing rolling.

In one form of the present disclosure, the first longitudinally mounted spring 10 and the second longitudinally mounted spring 20 generating vertical stiffness of the vehicle and the transversely mounted spring 30 generating roll stiffness are connected to each other and form an H shape. When the vehicle moves in the up-down direction, a torsional force is additionally generated by the transversely mounted spring 30, as well as vertical stiffness of the vehicle by the first longitudinally mounted spring 10 and the second longitudinally mounted spring 20, and thus, vertical stiffness is significantly increased, thus enhancing running stability.

In addition, when both wheels move in mutually opposite phases (bump occurs at one wheel and rebound occurs at the other wheel), vertical stiffness of the vehicle by the first longitudinally mounted spring 10 and the second longitudinally mounted spring 20, as well as roll stiffness by the transversely mounted spring 30, is additionally generated, and thus, roll stiffness is significantly increased, thus enhancing running stability.

In other words, the moment bump occurs at one vehicle, a reaction force is generated on the opposite side due to a change in the transversely mounted spring 30, and here, the reaction force acts as a rigid body supporting a load, whereby roll stiffness of the vehicle is enhanced.

As described above, since more torsional force can be induced through the connection structure of the first longitudinally mounted spring 10, the second longitudinally mounted spring 20, and the transversely mounted spring 30, stiffness may be enhanced, and thus, in the present disclosure, under the condition that the same stiffness is realized, the spring may be realized to be thinner, obtaining advantages of reducing cost and weight.

In other form of the present disclosure, the suspension system further includes a support member 40 placed on the transversely mounted spring 30 and disposed in a transverse direction, having one side (left end) and the other side (right end) connected to the vehicle body 1 and a middle portion connected to the transversely mounted spring 30.

Since the support member 40 may be formed of either steel or a composite material, and a roll angle may be significantly reduced by the support member 40 connected to the transversely mounted spring 30, and thus, roll stiffness and vertical stiffness may be further enhanced.

The transversely mounted spring 30 includes a first transversely mounted spring 31 integrally formed with the first longitudinally mounted spring 10 in a T shape and a second transversely mounted spring 32 integrally formed with the second longitudinally mounted spring 20 in a T shape. The first transversely mounted spring 31 and the second transversely mounted spring 32 are formed to have the same length, and an end portion of the first transversely mounted spring 31 and an end portion of the second transversely mounted spring 32 are connected via a connection bracket 50.

The first transversely mounted spring 31 is integrally formed in a direction perpendicular to a longitudinal middle point of the first longitudinally mounted spring 10, and the second transversely mounted spring 32 is integrally formed in a direction perpendicular to a longitudinal middle point of the second longitudinally mounted spring 20.

The transversely mounted spring 30 may be configured as a single component, but in consideration of a layout according to the installation of the first longitudinally mounted spring 10 and the second longitudinally mounted spring 20, and other peripheral components, the transversely mounted spring 30 is configured to include separate first transversely mounted spring 31 and second transversely mounted spring 32, and the first transversely mounted spring 31 and the second transversely mounted spring 32 are connected using the connection bracket 50 as in the present disclosure. To this end, the connection bracket 50 includes one recess 51 and the other recess 52 which are inserted in a direction in which an end portion of the first transversely mounted spring 10 and an end portion of the second transversely mounted spring 20 face each other.

The support member 40 has a U-shape opened downward toward the transversely mounted spring 30. An intermediate bracket 60 is superposed on the connection bracket 50, the intermediate bracket 60 is inserted into the support member 40, and in this state, a middle portion of the support member 40 may be connected to the transversely mounted spring 30a as a bolt 70 sequentially penetrates through the support member 40, the intermediate bracket 60, the connection bracket 50, and the first and second transversely mounted springs 31 and 32 so as to be coupled.

An upper cover bracket 81 and a lower cover bracket 82 respectively wrap the portion where the first longitudinally mounted spring 10 and the first transversely mounted spring 31 are connected and the portion where the second longitudinally mounted spring 20 and the second transversely mounted spring 32 are connected. A U-bolt 83 wraps the upper cover bracket 81 and penetrates through the lower cover bracket 82. A nut 84 is fastened to an end portion of the U-bolt 83 penetrating through the lower cover bracket 82, and the lower cover bracket 82 is integrally coupled to an axle bracket 3 connecting opposing rear axles 5. Accordingly, the portion where the first longitudinally mounted spring 10 and the first transversely mounted spring 31 are connected and the portion where the second longitudinally mounted spring 20 and the second transversely mounted spring 32 are connected are each connected to the axle bracket 3.

As described above, according to the exemplary forms of the present disclosure, since the first longitudinally mounted spring 10 and the second longitudinally mounted spring 20 generating vertical stiffness of the vehicle and the transversely mounted spring 30 generating roll stiffness are connected to each other, torsional force is additionally generated during a longitudinal behavior and rolling behavior of the vehicle to significantly improve stiffness, and in particular, stiffness of the vehicle may further be strengthened by the support member 40 connecting the transversely mounted spring 30 and the vehicle body 1, whereby running stability may be significantly enhanced.

Further, in the present disclosure, since a more torsional force is induced through the connection structure of the first longitudinally mounted spring 10 and the second longitudinally mounted spring 20 and the transversely mounted spring 30, stiffness may be enhanced, and thus, since the spring may be realized to be thinner under the condition of realizing the same stiffness, cost and weight may be reduced.

In the suspension system according to the present disclosure, since the first longitudinally mounted spring and the second longitudinally mounted spring generating vertical stiffness of the vehicle and the transversely mounted spring generating roll stiffness are connected, torsional force is additionally generated during a longitudinal behavior and rolling behavior of the vehicle to significantly improve stiffness, and in particular, stiffness of the vehicle may further be strengthened by the support member connecting the transversely mounted spring and the vehicle body, whereby running stability may be significantly enhanced.

Further, in the present disclosure, since a more torsional force is induced through the connection structure of the first longitudinally mounted spring and the second longitudinally mounted spring and the transversely mounted spring, stiffness may be enhanced, and thus, since the spring may be realized to be thinner under the condition of realizing the same stiffness, cost and weight may be reduced.

Although the present disclosure has been shown and described with respect to specific forms, it will be apparent to those having ordinary skill in the art that the present disclosure may be variously modified and altered without departing from the spirit and scope of the present disclosure.

What is claimed is:

1. A suspension system for a vehicle with a spring formed of a composite material, the suspension system comprising:
   a first longitudinally mounted spring and a second longitudinally mounted spring respectively formed of a composite material and arranged on a left side and a right side of the vehicle, wherein the first and second longitudinally mounted springs extend in a front-rear direction of the vehicle, and each have one side and another side, both sides connected to a vehicle body of the vehicle;
   a transversely mounted spring formed of a composite material, connected to the first longitudinally mounted spring and the second longitudinally mounted spring and installed in a transverse direction of the vehicle; and
   an axle bracket connected to a portion where the first longitudinally mounted spring and the transversely mounted spring are connected,
   wherein the axle bracket is connected to a portion where the second longitudinally mounted spring and the transversely mounted spring are connected,
   wherein the transversely mounted spring includes:
      a first transversely mounted spring integrally formed with the first longitudinally mounted spring, and
      a second transversely mounted spring integrally formed with the second longitudinally mounted spring, and
   wherein the first transversely mounted spring and the second transversely mounted spring are connected by a connection bracket.

2. The suspension system of claim 1, further comprising:
   a support member placed on the transversely mounted spring and disposed in the transverse direction, and including: one side and other side connected to the vehicle body, and a middle portion connected to the transversely mounted spring.

3. The suspension system of claim 2, wherein an intermediate bracket is superposed on the connection bracket, and
   wherein a middle portion of the support member is connected to the transversely mounted spring by a bolt penetrating through the support member, the intermediate bracket, the connection bracket, and the first and second transversely mounted springs.

4. The suspension system of claim 2, wherein
   the first longitudinally mounted spring, the second longitudinally mounted spring, and the transversely mounted spring are formed of a composite material, and the support member is formed of either steel or a composite material.

5. The suspension system of claim 1, wherein the connection bracket includes one recess and another recess, which are inserted in a direction in which an end portion of the first transversely mounted spring and an end portion of the second transversely mounted spring face to each other.

6. The suspension system of claim 1, further comprising:
an upper cover bracket and a lower cover bracket wrapping the portion where the first longitudinally mounted spring and the transversely mounted spring are connected and the portion where the second longitudinally mounted spring and the transversely mounted spring are connected, respectively; and
a U-bolt wrapping the upper cover bracket and penetrating through the lower cover bracket and a nut fastened to the U-bolt,
wherein the lower cover bracket is integrally coupled to the axle bracket.

7. A suspension system for a vehicle with a spring formed of a composite material, the suspension system comprising:
a first longitudinally mounted spring and a second longitudinally mounted spring respectively formed of a composite material and arranged on a left side and a right side of the vehicle, wherein the first and second longitudinally mounted springs extend in a front-rear direction of the vehicle, and each have one side and another side, both sides connected to a vehicle body of the vehicle;
a transversely mounted spring formed of a composite material, integrally formed with each of the first longitudinally mounted spring and the second longitudinally mounted spring and installed in a transverse direction of the vehicle; and
an axle bracket configured to connect a first portion and a second portion,
wherein the first portion is a portion where the first longitudinally mounted spring and the transversely mounted spring are connected to each other, and
wherein the second portion is a portion where the second longitudinally mounted spring and the transversely mounted spring are connected to each other.

8. The suspension system of claim 7, further comprising:
a support member placed on the transversely mounted spring and disposed in the transverse direction, and including: one side and other side connected to the vehicle body, and a middle portion connected to the transversely mounted spring.

9. The suspension system of claim 8, wherein the support member is formed of either steel or a composite material.

10. The suspension system of claim 7, wherein the transversely mounted spring includes:
a first transversely mounted spring integrally formed with the first longitudinally mounted spring, and
a second transversely mounted spring integrally formed with the second longitudinally mounted spring, and
wherein the first transversely mounted spring and the second transversely mounted spring are connected by a connection bracket.

* * * * *